(12) United States Patent
Yokoyama et al.

(10) Patent No.: US 6,520,651 B1
(45) Date of Patent: Feb. 18, 2003

(54) RETROREFLECTIVE SHEET

(75) Inventors: Yukio Yokoyama, Tokyo (JP); Osamu Tanaka, Tochigi (JP); Takehiro Ishihara, Tochigi (JP); Hiroki Nakazawa, Tochigi (JP)

(73) Assignee: Nippon Carbide Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/869,383

(22) PCT Filed: Mar. 1, 2000

(86) PCT No.: PCT/JP00/01206

§ 371 (c)(1),
(2), (4) Date: Jun. 28, 2001

(87) PCT Pub. No.: WO00/52502

PCT Pub. Date: Sep. 8, 2000

(30) Foreign Application Priority Data

Mar. 3, 1999 (JP) ............................................. 11-55485

(51) Int. Cl.$^7$ ................................................. G02B 5/12
(52) U.S. Cl. ........................ 359/515; 359/536; 359/538; 359/541
(58) Field of Search ................................. 359/515, 536, 359/538, 541, 529, 530, 531, 532, 533; 428/174, 156, 141, 148, 161, 164, 167, 412, 483

(56) References Cited

U.S. PATENT DOCUMENTS

| 4,085,314 A | 4/1978 | Schultz et al. | |
|---|---|---|---|
| 4,268,117 A | 5/1981 | Sevelin | |
| 4,763,985 A | * 8/1988 | Bingham | 359/518 |
| 4,767,659 A | * 8/1988 | Bailey et al. | 428/203 |
| 5,514,441 A | * 5/1996 | Pohto et al. | 428/72 |
| 5,888,618 A | * 3/1999 | Martin | 428/156 |
| 6,155,689 A | * 12/2000 | Smith | 359/530 |
| 6,243,201 B1 | * 6/2001 | Fleming et al. | 359/530 |
| 6,280,822 B1 | * 8/2001 | Smith et al. | 428/161 |

FOREIGN PATENT DOCUMENTS

| JP | 2-84476 | 3/1990 |
| JP | 8-188751 | 7/1996 |

* cited by examiner

*Primary Examiner*—Mohammad Sikder
(74) *Attorney, Agent, or Firm*—Young & Thompson

(57) ABSTRACT

Retroreflective sheeting (1) comprises a reflective base (2), a transparent film layer (4) which is colored different from the color of reflected light of the reflective base (2) and a pressure-sensitive adhesive layer (3). The transparent film layer (4) is removably provided on the reflective base (2) via the pressure-sensitive adhesive layer (3). Part (4') of the transparent film layer (4) is to be cut out on use so that the transparent film layer (4) may form a desired image. The peel strength between the transparent film layer (4) and the reflective base (2) is 25 to 400 gf/25 mm. After the transparent film layer (4) is pressed to the reflective base (2) under a pressure of 5 kgf/cm$^2$, the peel strength between the transparent film layer (4) and the reflective base (2) is 700 gf/25 mm or greater.

7 Claims, 2 Drawing Sheets

RETROREFLECTIVE SHEET

TECHNICAL FIELD

The present invention relates to retroreflective sheeting and, more particularly, to retroreflective sheeting useful for various signs such as road signs, guide signs, and "Under Construction" signs.

BACKGROUND ART

A retroreflective sheet which reflects incident light toward the light source has been well known, and its excellent visibility in the night ascribed to the reflection performance has been taken advantage of in various technical fields. For example, road signs, "Under Construction" signs, etc. made of retroreflective sheeting have excellent characteristics such that they reflect the light from a light source, for example, headlights of a running car, in the direction toward the light source, i.e., toward the running car in the night to provide excellent visibility for sign viewers, i.e., car drivers.

Characters or figures for giving information are formed on the retroreflective sheet by screen printing directly on a reflective base or pasting pieces cut out of films to the reflective base. In Japan, for example, warning signs are made by screen printing characters or figures on a white retroreflective sheet, and road signs are prepared by pasting characters or figures cut out of white retroreflective sheeting to a green reflective base for expressways or a blue reflective base for general roads. Making of signs involving such a combination of different operations requires a lot of time and labor to form characters or figures. It has therefore been demanded to develop retroreflective sheeting on which highly visible characters or figures for information can easily be provided by cutting and peeling part of a transparent color film adhered to a retroreflective sheet by means of, for example, a computer-aided cutting machine, thereby to exclude the necessity of cut-and-paste operation or screen printing. However, retroreflective sheeting of the type in which part of a film layer is cut out therefrom generally has such problems that: the film layer having a high peel strength would be difficult to remove, making it difficult to form characters or figures; and the film layer having a partially reduced peel strength for the purpose of easy removal thereof would peel off during use.

Related art pertaining to this type of retroreflective sheeting includes retroreflective sheeting disclosed in U.S. Pat. No. 4,268,117 which comprises a base retroreflective sheeting and a film provided thereon via an adhesive layer composed of a pressure-sensitive adhesive layer and a heat-susceptible adhesive layer; and retroreflective sheeting disclosed in U.S. Pat. No. 4,085,314 which comprises a retroreflective base sheet and a cover film provided thereon via an adhesive layer, the cover film having been partially precut. Production of the retroreflective sheeting having two kinds of adhesive layers involves two steps for forming the adhesive layers and needs wise selection of the two kinds of adhesives.

DISCLOSURE OF THE INVENTION

Accordingly, an object of the present invention is to provide retroreflective sheeting which is capable of easily forming characters or figures with excellent visibility for giving information and of which the film layer hardly peels off during use.

The present invention relates to retroreflective sheeting comprising a reflective base, a transparent film layer which is colored different from the color of reflected light of said reflective base and a layer of a pressure-sensitive adhesive, said transparent film layer being removably provided on said reflective base via said layer of said pressure-sensitive adhesive, part of said transparent film layer being to be cut out on use so that said transparent film layer may form a desired image, the peel strength between said transparent film layer and said reflective base is 25 to 400 gf/25 mm, and, after said transparent film layer is pressed to said reflective base under a pressure of 5 kgf/cm$^2$, the peel strength between said transparent film layer and said reflective base is 700 gf/25 mm or greater.

BEST MODE FOR CARRYING OUT THE INVENTION

Figure 1:
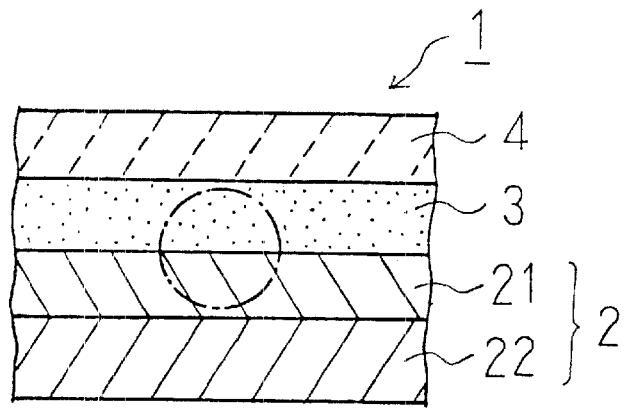
FIG. 1 is a schematic cross section showing a first embodiment of the retroreflective sheeting according to the present invention.
Figure 2:
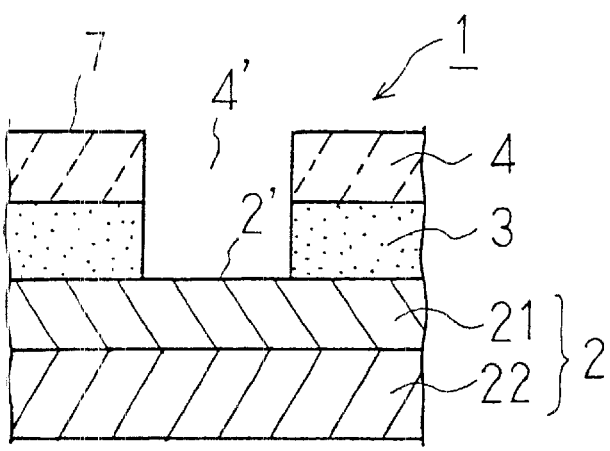
FIG. 2 is a schematic cross section showing a usage of the retroreflective sheeting of FIG. 1.
Figure 3:
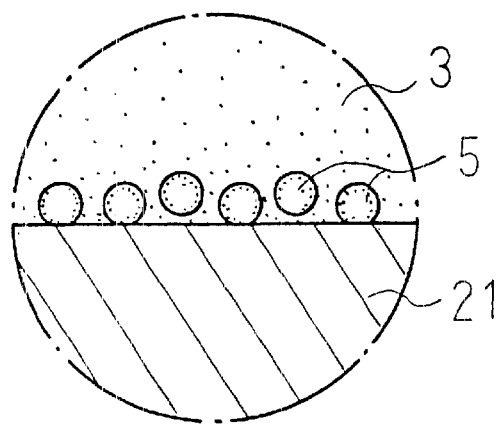
FIG. 3 is a schematic enlarged cross section of an essential part of the retroreflective sheeting of FIG. 1.
Figure 4:
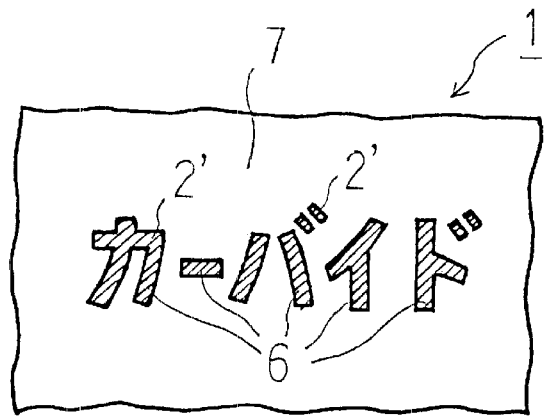
FIG. 4 is a plane view showing a usage of the retroreflective sheeting of FIG. 1.

The retroreflective sheeting of the present invention will be described in detail based on its preferred embodiments with reference to the accompanying drawings. FIG. 1 is a schematic cross section showing a first embodiment of the retroreflective sheeting according to the present invention. FIG. 2 is a schematic cross section displaying a usage of the retroreflective sheeting of FIG. 1. FIG. 3 is a schematic enlarged cross section of an essential part of the retroreflective sheeting of FIG. 1. FIG. 4 is a plane view showing a usage of the retroreflective sheeting of FIG. 1.

As shown in FIG. 1, the retroreflective sheeting 1 according to the first embodiment comprises a reflective base 2 having removably provided thereon a transparent film layer 4 via a layer 3 of a pressure-sensitive adhesive, the transparent film layer 4 being colored different from the color of light reflected on the reflective base 2.

When the retroreflective sheeting 1 of the first embodiment is used, a part 4' of the transparent film layer 4 is cut out as shown in FIG. 2 so that the transparent film layer 4 may form a desired image. The image formed in the first embodiment is a negative image as depicted in FIG. 4, in which a part 2' of the reflective base 2 that appears on cutting the part 4' out of the transparent film layer 4 works as an informative area 6, such as a character or a figure, while the transparent film layer 4 serves as a background 7. The image can be a positive one, in which the part 2' of the reflective base 2 that appears on cutting the part 4' out of the transparent film layer 4 works as a background 7, while the transparent film layer 4 serves as an informative area 6, such as a character or a figure.

The peel strength between the transparent film layer and the reflective base used in the first embodiment is 25 to 400 gf/25 mm, preferably 50 to 300 gf/25 mm, still preferably 70 to 250 gf/25 mm. If the peel strength is less than 25 gf/25 mm, the remaining part of the transparent film left after cutting out part of it to serve as an informative area of a positive image is liable to come off. If the peel strength exceeds 400 gf/25 mm, the part to be cut out of the transparent film layer for leaving a positive image initiates tear, etc. and cannot be removed. The peel strength between the transparent film layer and the reflective base can be measured with a tensile tester by separating the transparent film layer together with the pressure-sensitive adhesive layer from the reflective base at a peel angle of 180°.

After the transparent film layer is pressed to the reflective base under a pressure of 5 kgf/cm$^2$, the peel strength between the transparent film layer and the reflective base is 700 gf/25 mm or greater, preferably 1000 gf/25 mm or greater, still preferably 1200 gf/25 mm or greater. If this peel strength is less than 700 gf/25 mm, the transparent film layer is apt to peel off when exposed under severe conditions, e.g., outdoors. While it is more desirable for the transparent film layer and the reflective base to have a greater peel strength after pressing the transparent film layer onto the reflective base under a pressure of 5 kgf/cm$^2$, an achievable upper limit of this peel strength is usually about 4000 gf/25 mm. In pressing the transparent film layer to the reflective base, pressure can be applied by an arbitrary means, for example, by hand, with a rubber roll or with a squeegee. If necessary, heat can be applied while pressing.

According to the first embodiment, the pressure-sensitive adhesive is applied to the entire surface of the transparent film layer to form a pressure-sensitive adhesive layer. The pressure-sensitive adhesive is not particularly limited as long as the above-mentioned peeling characteristics are achieved and light transmission through the transparent film layer and light reflection on the reflective base are not impaired. Examples of preferred pressure-sensitive adhesives are (meth)acrylic resins, vinyl acetate resins, polyester resins, urethane resins, rubber resins, fluororesins, and silicone resins. Particularly preferred of them are (meth)acrylic resins for their transparency, weatherability, relative inexpensiveness, and processing suitability.

The pressure-sensitive adhesive layer preferably has a thickness of 20 to 100 μm, particularly 30 to 70 μm, for developing the specific peel strength between the transparent film layer and the reflective base after pressing.

As illustrated in FIG. 3, the retroreflective sheeting of the first embodiment has solid particles 5 dispersed and fixed on a side of the pressure-sensitive adhesive layer 3 which side faces the reflective base 2 so that the peel strength between the transparent film layer 4 and the reflective base 2 may fall within the above-specified range.

The solid particles are not particularly limited as far as they are capable of controlling the peel strength between the transparent film layer and the reflective base within the specific range and cause no hindrance to light transmission through the transparent film layer and light reflection on the reflective base. Examples include inorganic solid particles, such as barium carbonate, calcium sulfate, barium sulfate, aluminum sulfate, molybdenum disulfide, aluminum hydroxide, alumina, silica, magnesium oxide, calcium oxide, and glass beads; and organic solid particles, such as styrene resins, vinyl chloride resins, (meth)acrylic resins, polypropylene resins, polyethylene resins, melamine resins, urea resins, silicone resins, and other resins. Organic solid particles are preferred. Particles made of the same material as constitutes the pressure-sensitive adhesive are desirable; for they will be integrated with the pressure-sensitive adhesive after being pressed. It is more desirable that the solid particles, the transparent film layer, and the pressure-sensitive adhesive be all made up of the same material. It is the most desirable for these components be made of (meth)acrylic resins.

The solid particles can be either hollow or solid (not hollow). It is particularly preferred to use a not-hollow particles to prevent light scattering.

The solid particles preferably have an average particle size of 10 to 60 μm, particularly 20 to 40 μm, so that the specific after-pressing peel strength may be developed between the transparent film layer and the reflective base.

It is preferred for the solid particles to have a coverage ratio of 5 to 30%, particularly 10 to 20%, based on the surface area of the pressure-sensitive adhesive layer, from the viewpoint of the balance between the peel strength before pressing and that after pressing. The peel strength in this context refers to a strength between the transparent film layer and the reflective base. The terminology "coverage ratio" as used herein denotes the area ratio of the solid particles appearing on the surface (a plane) of the reflective base side of the pressure-sensitive adhesive layer to the surface area of the pressure-sensitive adhesive layer.

The solid particles are dispersed and fixed on the reflective base side of the pressure-sensitive adhesive layer by means of, for example, a flour dusting machine, a powder sprinkler, a powder sprayer, etc. The solid particles are thus dispersed and fixed on the surface of the pressure-sensitive adhesive layer with part of them embedded in the pressure-sensitive adhesive layer.

When the solid particles are dispersed and fixed as described above, the layer of the solid particles formed on the reflective base side surface of the pressure-sensitive adhesive layer constitutes a part of the pressure-sensitive adhesive layer as depicted in FIG. 3. It is effective for developing the after-pressing peel strength between the transparent film layer and the reflective base that the pressure-sensitive adhesive layer is adhered to the reflective base with the solid particles being in such a dispersed and fixed state that the particles have a scatter thickness (an average height L of the part projecting over the pressure-sensitive adhesive layer; see FIG. 3) of 3 to 30 μm, particularly 5 to 20 μm.

To improve the transparency of the pressure-sensitive adhesive layer, it is desirable that the solid particles be made of materials whose refractive index ranges from 80 to 120%, particularly 90 to 110%, of the refractive index of the pressure-sensitive adhesive.

The transparent film layer used in the first embodiment is colored different from the color of the reflected light from the reflective base and is removably provided via the above-described pressure-sensitive adhesive layer. The term "colored different" as used herein means to be colored in a color distinguishable with the naked eye, including a color which has the same hue but a different lightness or chroma and also including achromatic colors. The color of the transparent film layer is not particularly limited as long as it is distinguishable, but a greater difference from the color of the reflected light is desirable to provide increased distinguishability (improved visibility), enabling a viewer to clearly distinguish the characters or figures.

The material constituting the transparent film layer includes (meth)acrylic resins, urethane resins, polyester resins, vinyl chloride resins, vinylidene chloride resins, and fluororesins. The same material as constitutes the above-described solid particles is preferred. As previously noted, it is still preferred that all the transparent film layer, the pressure-sensitive adhesive and the solid particles be made up of the same material. It is particularly preferred for all these members be made of (meth)acrylic resins.

The transparent film layer preferably has a thickness of 20 to 150 µm, particularly 40 to 120 µm, in view of ease in cutting the film to make characters or figures for information.

The reflective base which can be used in the present embodiment is selected from those heretofore known. Useful reflective bases include lens type retroreflective sheeting, such as enclosed lens type retroreflective sheeting as described in Japanese Patent Laid-Open No. 8-152508 and encapsulated lens type retroreflective sheeting, and pyramidal cube-corner retroreflective sheeting as disclosed in Japanese Patent Laid-Open No. 10-123309. Inter alia, capsule lens type retroreflective sheeting and pyramidal cube-corner retroreflective sheeting are suitable.

A reflective base comprising the lens type retroreflective sheeting comprises a surface protective layer 21 and a beads-holding layer 22 as shown in FIGS. 1 and 2. The surface protective layer 21 is a layer having a function for protecting the glass beads having a light reflection function against contact with moisture, dust, etc. thereby to maintain stable light reflecting ability. The beads-holding layer 22 is a layer having a function for fixing glass beads having a light reflection function at given positions thereby to maintain the light reflecting ability. Materials of the surface protective layer 21 include acrylic resins, polyester resins, vinyl chloride resins, vinylidene chloride resins, urethane resins, polyethylene resins, fluororesins, and melamine resins. Materials of the beads-holding layer 22 include acrylic resins, polyester resins, urethane resins, and melamine resins.

As described above, the retroreflective sheeting of the first embodiment has the solid particles 5 dispersed and fixed on the reflective base 2 side of the pressure-sensitive adhesive layer 3 (see FIG. 3) so that the peel strength between the transparent film layer 4 and the reflective base 2 may fall within the above-specified range. As a result, it is easy to cut out (peel) a part 4' of the transparent film layer 4 together with a part of the pressure-sensitive adhesive layer 3 from the reflective base 2. Thus, it is easy to cut out a part of the transparent film layer together with the pressure-sensitive adhesive layer along a desired pattern by means of, for example, a computer-aided cutting machine to form characters or figures for giving information. After the cutting, the transparent film layer of the retroreflective sheeting is pressed onto the reflective base under the above-specified pressure, whereupon the solid particles on the surface of the pressure-sensitive adhesive layer are buried in the pressure-sensitive adhesive layer. As a result, the peel strength between the transparent film layer and the reflective base is enhanced, and the transparent film layer hardly peels during use.

Accordingly, the retroreflective sheeting according to the first embodiment is suited for use in signs, such as road signs, guide signs, and "Under Construction" signs, especially road signs having characters or figures on them for giving information on reflecting light from cars, etc. in the night.

Figure 5:
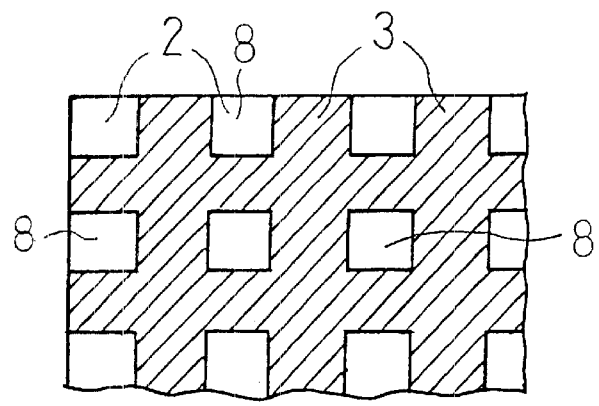
FIG. 5 is a plan view of a second embodiment of the retroreflective sheeting according to the present invention, with the transparent film layer removed.

A second embodiment of the retroreflective sheeting shown in FIG. 5 is described. FIG. 5 is a plan view of the second embodiment of the retroreflective sheeting according to the present invention, from which the transparent film layer is omitted.

The difference between the retroreflective sheeting of the second embodiment from that of the first one resides in that: in the first embodiment a pressure-sensitive adhesive is applied to the entire surface of the transparent film layer 4, and solid particles are dispersed and fixed thereon; while in the present embodiment, no solid particles are used but, instead, the pressure-sensitive adhesive is applied to the transparent film layer 4 in such a manner as to form non-applied parts 8 to form the pressure-sensitive adhesive layer 3. By distributing the non-applied parts 8, the peel strength between the transparent film layer 4 and the reflective base 2 and the peel strength therebetween after pressing the transparent film layer 4 to the reflective base under a pressure of 5 kgf/cm$^2$ can be controlled within the above-specified respective ranges.

The pattern of the non-applied parts is not particularly restricted. For example, the non-applied parts can have a repetitive pattern of regularly spaced squares, with the applied parts forming a network, as shown in FIG. 5, a repetitive pattern of circles, or their reversal patterns.

The size of the individual non-applied parts is not particularly limited provided that the peel strength between the transparent film layer and the reflective base before pressing and that after pressing fall within the respective ranges. It is preferred that the non-applied parts be distributed almost uniformly over the entire area of the transparent film layer.

Considering the balance between the peel strength between the transparent film layer and the reflective base before pressing and that after pressing, the pressure-sensitive adhesive is preferably applied to the transparent film layer in a coating area ratio (coating area of the pressure-sensitive adhesive/total area of the transparent film layer) of 20 to 60%, particularly 30 to 50%, while forming non-applied parts. The thickness of the pressure-sensitive adhesive layer 3 is just about the same as in the first embodiment.

Since the pressure-sensitive adhesive layer 3 in the retroreflective sheeting of the second embodiment has non-applied parts 8 distributed, a part 4' of the transparent film layer 4 can be cut out easily. On pressing the transparent film layer 4 to the reflective base 2 under the above-specified pressure, the most of the non-applied parts 8 disappear or reduce to make the transparent film layer 4 hardly removable from the reflective base 2. Accordingly, the retroreflective sheeting according to the second embodiment produces the same effects as obtained by the retroreflective sheeting of the first embodiment.

Figure 6:
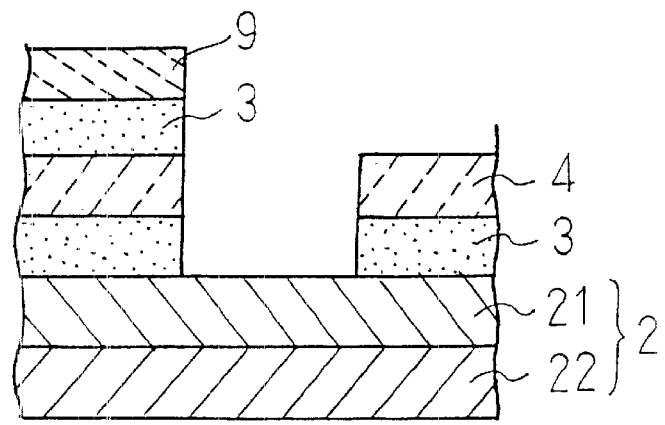
FIG. 6 is a schematic cross section showing a usage of a third embodiment of the retroreflective sheeting according to the present invention.

A third embodiment of the retroreflective sheeting according to the present invention, which is shown in FIG. 6, is then described. FIG. 6 is a schematic cross section illustrating a usage of the third embodiment of the retroreflective sheeting according to the present invention. The retroreflective sheeting of the third embodiment additionally comprises another transparent film layer 9 which is colored different from the color of the transparent film layer 4 and provided on the transparent film layer 4 via another pressure-sensitive adhesive layer 3. One or more of the transparent film layers can be used. Such a structure provides retroreflective sheeting suited to a variety of applications. The retroreflective sheeting of the third embodiment also produces the same effects as obtained from the retroreflective sheeting of the first embodiment.

Constituent requirements that have been described about the first embodiment and have not been or will not be referred to with regard to the second and third embodiments apply to the second and third embodiments.

The retroreflective sheeting according to the present invention is not limited to the aforementioned preferred embodiments. For example, the transparent film layer can be not only colored in a single color but dividedly colored in different colors, and it can have figures, symbols, etc. The means for cutting out part of the transparent film layer is not limited to the computer-aided cutting machine and includes other various means. The transparent film layer used in the first and second embodiments can have a multi-layered structure including not only the structure of the third embodiment but other various structures.

The first, second and third embodiments can be carried out in an appropriate combination. For example, the pressure-sensitive adhesive layer of the first embodiment, which has solid particles fixedly dispersed on its surface on the reflective base side, can be formed on the transparent film layer while leaving non-applied parts distributed like the pressure-sensitive adhesive layer of the second embodiment. The reflective base used in the above embodiments can have provided on the reverse side thereof (opposite to the side facing the transparent film layer) an adhesive layer for setting which is used for adhering the reflective base to an aluminum plate, etc. and an adhesive protective layer comprising a film, paper, etc. which protects the adhesive layer for setting against contamination with dust, etc. until use.

EXAMPLES

The present invention will now be illustrated in greater detail with reference to Examples and Comparative Examples.

Examples 1 to 8

Solid particles shown in Table 1 below were uniformly scattered on the pressure-sensitive adhesive layer of a transparent laminate composed of a transparent film layer and a pressure-sensitive adhesive layer (Nikkalite A106P (trade name), available from NIPPON CARBIDE KOGYO KABUSHIKI KAISHA; film composition: acrylic copolymer; film thickness: about 75 $\mu$m; film color: transparent blue; pressure-sensitive adhesive composition: acrylic copolymer; pressure-sensitive adhesive layer thickness: 60 $\mu$m). Release paper was put on the solid particles side, and a controlled pressure was imposed on the solid particles to embed the solid particles into the pressure-sensitive adhesive layer so that the solid particles might have the coverage ratio and the scatter thickness shown in Table 1.

The release paper was removed from the transparent laminate having the solid particles embedded. The solid particles-embedded side was brought into contact with the front side of a encapsulated lens type reflective base (Nikkalite ULS F812, available from NIPPON CARBIDE KOGYO KABUSHIKI KAISHA; reflected light color: white) having, on the reverse side thereof, an adhesive layer for setting and an adhesive protective layer. The transparent laminate and the reflective base were then pressed together under a pressure of 2 kgf/cm$^2$ to prepare a retroreflective sheet having the structure shown in FIG. 1.

Example 9

A retroreflective sheet shown in FIG. 5 was prepared in the same manner as in Example 1, except that the pressure-sensitive adhesive layer of the transparent laminate used in Examples 1 to 8 was applied alone without the solid particles embedded therein and that the pressure-sensitive adhesive layer was formed on the transparent film layer with a thickness of 60 $\mu$m in a checkered pattern to cover about 35% of the entire area of the transparent film layer.

Example 10

A retroreflective sheet shown in FIG. 1 was prepared in the same manner as in Example 1, except that the encapsulated lens type reflective base used in Examples 1 to 8 was replaced with a pyramidal cube-corner retroreflective base (Nikkalite Crystal 90802, available from NIPPON CARBIDE KOGYO KABUSHIKI KAISHA; reflected light color: white) having on the reverse side thereof an adhesive layer for setting and an adhesive protective layer.

Comparative Examples 1 to 3

A retroreflective sheet shown in FIG. 1 was prepared in the same manner as in Example 1, except for adopting the conditions for Comparative Examples 1 to 3 shown in Table 1.

Measurement of Peel Strength:

The retroreflective sheets of Examples 1 to 10 and Comparative Examples 1 to 3 were used as test samples. After the sample sheet was pressed under a pressure of 5 kgf/cm$^2$, cuts were made in the transparent film layer with a cutter, and the transparent film layer was slightly peeled off the reflective base. The sample was set on a tensile tester (Model UCT-5T, supplied by Orientec) with one end fixed to a load cell side chuck and the end of the slightly peeled transparent film layer fixed to a stationary chuck. The 180° peel strength was measured at a rate of pulling of 300 mm/min.

Cutting Workability:

The transparent film layer was cut by means of a cutting plotter (Model CF-120, supplied by Mimaki Engineering Co., Ltd.), and the state of the sheet was observed to evaluate cutting workability.

Peeling Workability:

The part to be removed which had been cut with the cutting plotter was peeled off the sample, and the state of peeling was observed.

Outdoor Exposure:

The part to be removed was peeled off, and the remaining necessary part of the transparent film layer was pressed under a pressure of 5 kgf/cm$^2$. The sample thus prepared was exposed outdoors for 3 months, and the condition was observed.

TABLE 1

| | | | Solid Particles | | | | Coating Area Ratio | Peel Strength[*4] (gf/cm) | |
| | | | Avg. | | Scatter | Refractive | of Pressure- | | |
| | Reflective Base | Kind | Size ($\mu$m) | Coverage Ratio[*1] (%) | Thickness ($\mu$m) | Index Ratio[*2] (%) | Sensitive Adhesive[*3] (%) | Before Pressing | After Pressing |
|---|---|---|---|---|---|---|---|---|---|
| Example 1 | encapsulated lens | acrylic beads | 33 | 15 | 8 | 100 | 100 | 200 | 980 |
| Example 2 | encapsulated lens | acrylic beads | 58 | 18 | 7 | 100 | 100 | 130 | 810 |

TABLE 1-continued

|  |  | Solid Particles | | | | Coating Area Ratio | Peel Strength*4 (gf/cm) | |
|---|---|---|---|---|---|---|---|---|
|  |  |  | Avg. | Scatter | Refractive | of Pressure- | | |
|  | Reflective Base | Kind | Size (μm) | Coverage Ratio*1 (%) | Thickness (μm) | Index Ratio*2 (%) | Sensitive Adhesive*3 (%) | Before Pressing | After Pressing |
| Example 3 | encapsulated lens | acrylic beads | 12 | 13 | 8 | 100 | 100 | 230 | 1030 |
| Example 4 | encapsulated lens | acrylic beads | 33 | 10 | 5 | 100 | 100 | 380 | 1000 |
| Example 5 | encapsulated lens | acrylic beads | 33 | 20 | 7 | 100 | 100 | 80 | 770 |
| Example 6 | encapsulated lens | acrylic beads | 33 | 6 | 12 | 100 | 100 | 360 | 920 |
| Example 7 | encapsulated lens | styrene beads | 30 | 13 | 7 | 112 | 100 | 220 | 1010 |
| Example 8 | encapsulated lens | glass beads | 30 | 13 | 7 | 134 | 100 | 250 | 1000 |
| Example 9 | encapsulated lens | — | — | — | — | — | 35 | 360 | 760 |
| Example 10 | cube corner | acrylic beads | 33 | 15 | 7 | 100 | 100 | 210 | 990 |
| Comparative Example 1 | encapsulated lens | acrylic beads | 33 | 8 | 2 | 100 | 100 | 600 | 980 |
| Comparative Example 2 | encapsulated lens | acrylic beads | 75 | 10 | 30 | 100 | 100 | 0 | 5 |
| Comparative Example 3 | encapsulated lens | calcium carbonate | 1 | 80 | — | — | 100 | 180 | 210 |

*1Coverage ratio (area ratio) of solid particles based on pressure-sensitive adhesive layer surface area
*2Refractive index of solid particles-forming material/refractive index of pressure-sensitive adhesive
*3Coating area of pressure-sensitive adhesive/total area of transparent film layer
*4Peel strength between transparent film layer and reflective base

TABLE 2

|  | Cutting Workability | Peeling Workability | Outdoor Exposure |
|---|---|---|---|
| Example 1 | good | good | pass |
| Example 2 | good | good | pass |
| Example 3 | good | good | pass |
| Example 4 | good | good | pass |
| Example 5 | good | good | pass |
| Example 6 | good | good | pass |
| Example 7 | good | good | pass*1 |
| Example 8 | good | good | pass*2 |
| Example 9 | good | good | pass |
| Example 10 | good | good | pass |
| Compara. Example 1 | good | unpeelable | — |
| Compara. Example 2 | peeled on cutting | — | — |
| Compara. Example 3 | good | good | peeled in 2 months |

*1The appearance was slightly uneven.
*2The appearance was slightly shiny.

It is apparent from these results that the retroreflective sheets of the present invention show excellent performance in cutting workability, peeling workability, and outdoor weatherability as compared with the comparative retroreflective sheets. Additionally, the sheets of Examples were extremely superior in ease of cutting the transparent film layer and after-pressing peel resistance of the transparent film layer.

Industrial Applicability

The retroreflective sheeting according to the present invention is capable of easily forming characters or figures with excellent visibility for information, and a film layer of the retroreflective sheeting hardly peels off during use.

What is claimed is:

1. Retroreflective sheeting comprising a reflective base, a transparent film layer which is colored different from the color of reflected light of said reflective base and a layer of a pressure-sensitive adhesive, said transparent film layer being removably provided on said reflective base via said layer of said pressure-sensitive adhesive, part of said transparent film layer being to be cut out on use so that said transparent film layer can form a desired image, the peel strength between said transparent film layer and said reflective base is 25 to 400 gf/25 mm, and, after said transparent film layer is pressed to said reflective base under a pressure of 5 kgf/cm², the peel strength between said transparent film layer and said reflective base is 700 gf/25 mm or greater.

2. The retroreflective sheeting according to claim 1, wherein solid particles are dispersed and fixed on a side of said layer of said pressure-sensitive adhesive which side faces said reflective base.

3. The retroreflective sheeting according to claim 2, wherein said solid particles are made of a material whose refractive index is 80 to 120% of the refractive index of said pressure-sensitive adhesive.

4. The retroreflective sheeting according to claim 2, wherein said solid particles are organic solid particles.

5. The retroreflective sheeting according to claim 2, wherein said solid particles have an average particle size of 10 to 60 μm.

6. The retroreflective sheeting according to claim 2, wherein said solid particles have a coverage ratio of 5 to 30% based on the surface area of said layer of said pressure-sensitive adhesive.

7. The retroreflective sheeting according to claim 1, wherein said layer of said pressure-sensitive adhesive is disposed on said reflective base in such a manner as to distribute parts where no pressure-sensitive adhesive is applied.

* * * * *